Patented Feb. 24, 1948

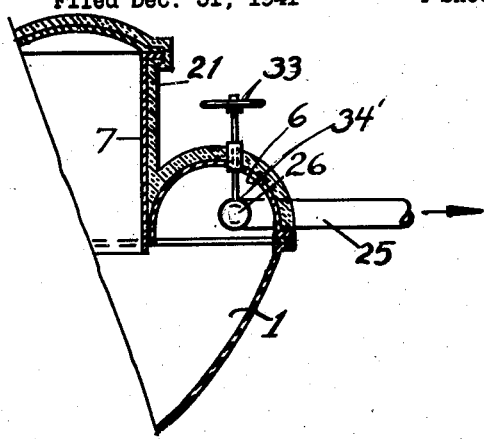
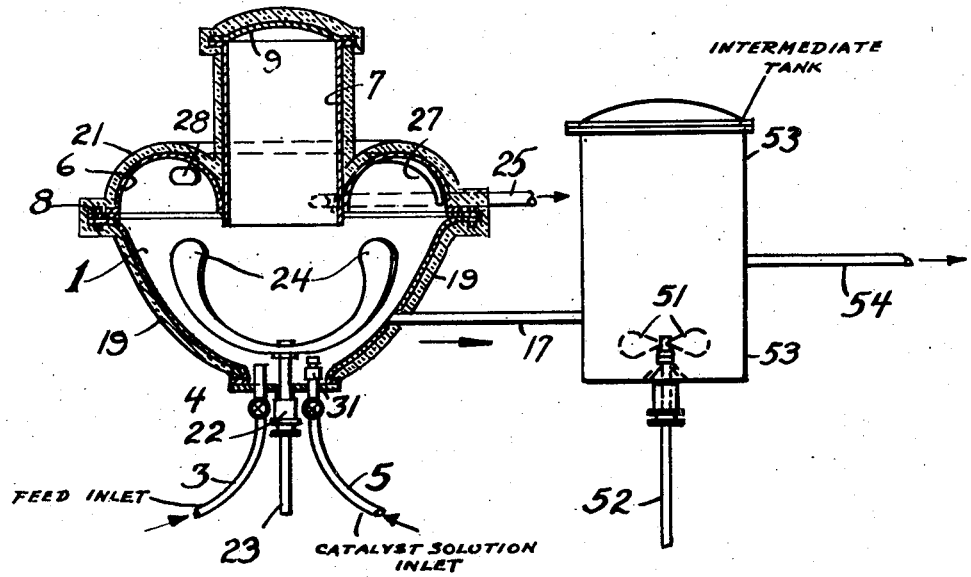

2,436,767

UNITED STATES PATENT OFFICE 2,436,767

LOW-TEMPERATURE POLYMER PRODUCTION

Robert A. Gerlicher, Cranford, N. J., assignor, by mesne assignments, to Jasco, Incorporated, a corporation of Louisiana Application December 31, 1941, Serial No. 425,066

5 Claims. (Cl. 260—94)

This invention relates to polymeric materials of the olefinic type; relates particularly to methods for the polymerization of olefinic materials; and relates especially to a polymerization device for conducting the polymerization of olefinic materials whereby the polymerizate formed is prevented from building up on the walls and impeller arms above the liquid reaction mixture level in the polymerizing device.

Various olefinic mixtures have been polymerized into very high molecular weight substances in reaction vessels of the straight wall type where a liquid interface between liquid and vapor meets the wall. In such a straight wall type reactor, having a vapor space, the polymerization of the various olefinic mixtures is readily conducted by the application to the olefins at very low temperatures of active halides or Friedel-Crafts type catalysts. This process is especially applicable to isobutylene at temperatures ranging from 0° C. to —110° C., under the influence of a catalyst such as boron trifluoride, in the presence of a diluent-refrigerant such as liquid propane, liquid ethane, liquid ethylene and the like; and it is particularly applicable to mixtures such as iso-olefins of the type of isobutylene in admixture with di-olefins such as butadiene, isoprene, pentadiene, dimethyl butadiene and the like, in the presence of similar diluent-refrigerants, by the application to the mixed olefins of a Friedel-Crafts type catalyst such as AlCl$_3$ dissolved in a low freezing solvent such as ethyl chloride or methyl chloride or carbon bisulfide or the like.

In using the straight wall reactors of the prior art, considerable difficulty has been experienced in that the formed polymer particles or slurry have had a tendency to coalesce and lump on the reactor walls especially at or above the interface into large aggregates which necessitated the opening of the reaction vessel at the end of about every second batch in order to remove the clumped polymer particles and especially to remove the lumped polymer particles from the side walls of the reaction vessel so as not to impede the operation of the agitating means in subsequent batch operations. Moreover, the straight wall type reactors are not readily adapted for continuous over-flow or draw-off for continuous polymer production. The present straight wall reactors are not satisfactory because of the shortcoming, as heretofore pointed out, of the tendency for the polymer formed to build up on the wall either below or above the liquid level in the reaction vessel or on the impeller arm above the liquid mixture level, thereby necessitating frequent shut-downs in order to remove the adhering polymer masses and prepare the reaction vessel for subsequent polymerization reactions.

The present invention provides a polymerization device of the concave hemispherical type, with an inverted concave annular cover superimposed thereon and having an agitator rotating in one direction whereby the liquid reaction mixture and the polymer formed during the polymerization reaction are swirled around and carried up the concave wall of the reaction vessel, over the concave annular under surface of the cover and returned to the center of the reaction vessel without forming a liquid interface on the walls of the reaction vessel at which polymer aggregates may form and break off. It has been found that by means of the device of the present invention desirable high molecular weight polymers are formed without the disadvantages of the straight wall reactor, thereby avoiding substantially all of the undesired reactions which otherwise occur in the straight wall reactor. The movement of the stirrer develops a centrifugal force which carries the reaction liquid upward along the sides of the reactor vessel to the inverted concave annular cover and over the under surface of the cover toward the center, and downward back into the body of fluid in the reactor vessel; thereby continuously washing the entire inner surface of the reactor vessel, and causing all of the moving reactant liquid to be directed past a top central opening in such a way as to avoid splashing of the reactant material onto unwashed surfaces, thereby avoiding the formation of accretion on the reactor walls, outside of the reaction zone, and avoiding the necessity of halting the procedure for cleaning the reactor.

Thus an object of the invention is to confine and control a reaction liquid in such a manner as to avoid the dispersion of reactive material onto unprotected surfaces, and to avoid the formation of accretions of product on unaccessible surfaces. Other objects and details of the invention will be apparent from the following description when read in connection with the accompanying drawings wherein Fig. 1 is a front view partly in vertical section through a polymerization reactor including a bowl-shaped conical vessel with an inverted concave annular cover thereon according to the invention.

Fig. 7 is a view in vertical section of an alternative embodiment of the polymerization reactor utilizing an intermediate tank by which a constant liquid head is maintained, and Fig. 8 is a view in vertical section of a butterfly deflecting valve along the lines VIII—VIII of Fig. 1.

Figure 1:
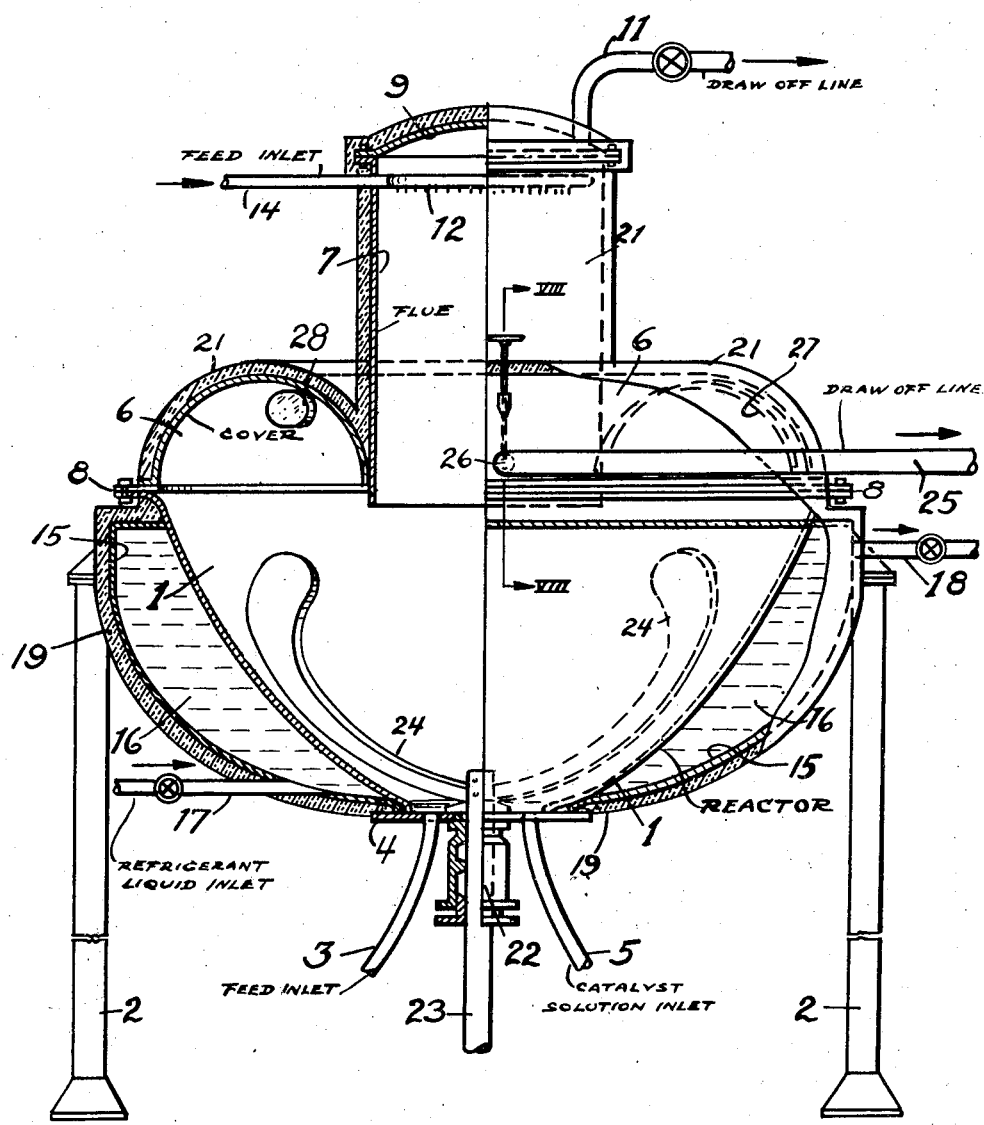
Figure 2:
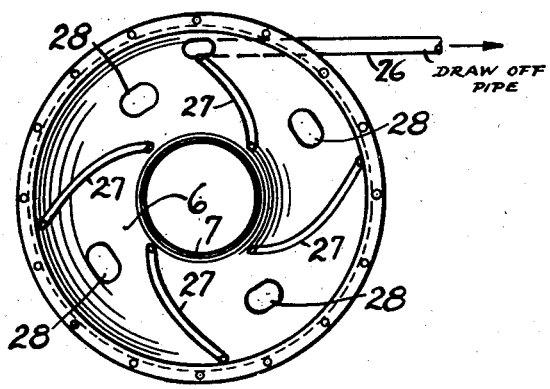
Fig. 2 is a view of the underside of the annular cover superimposed on the hemispherical reaction vessel of Fig. 1.

Referring to Figures 1 and 2, there is shown in these figures a preferred embodiment of the invention. This embodiment consists of a bowl-shaped polymerization reactor 1 mounted upon appropriate support members 2 and equipped with a feed line 3 for the delivery to the reactor of the olefinic reaction mixture. This feed line 3 is preferably led through the bottom plate member 4 forming the lower portion of the reactor 1. Another supply line 5 is provided, also passing through the bottom plate 4 for the delivery to the mixture of the catalyst solution. The bowl-shaped reactor member 1 is provided with an inverted, concave, annular cover member 6 in the center of which there is positioned a flue member 7 which serves as an outlet for volatilized gaseous material from the reaction mixture. The concave, annular cover member 6 is desirably attached to the reactor 1 by flanges and bolts 8. The flue member 7 is equipped with a cover member 9 likewise preferably held in place by bolts; and a draw-off line 11 is provided, preferably leading through the cover member 9 for conveying the evolved gaseous materials to the recovery system to be repurified for reuse. A perforated spray pipe member 12 is provided, positioned in the top of the flue member 7 and supplied with an appropriate wash liquid, such as ethyl chloride through a feed pipe 14.

The reactor 1 is desirably provided with a refrigerating jacket 15 which is conveniently filled with an appropriate refrigerant 16, such as liquid ethylene or other convenient refrigerant suitable for providing a desirably low temperature. The refrigerant liquid is supplied through a feed pipe 17 and the volatilized refrigerant is discharged through an outlet pipe 18 for recompression and reuse. The refrigerant jacket 15 is desirably surrounded by a layer of insulation 19 to reduce the inflow of heat from surrounding air; and the inverted, annular cover 6 likewise is desirably provided with a layer of heat insulation 21. The bottom plate 4 is provided with a stuffing box 22 through which the shaft 23 is passed. Upon the shaft 23 there is mounted an impeller 24 which is adapted for continuous rotation and swirls the contents of the reactor 1.

A draw-off pipe 25 is provided, passing through the cover member 6 for discharge of the polymerizate in slurry form. The rate of discharge of material is conveniently controlled by a butterfly valve member 26 as is well shown in Figure 8. Deflector members 27 are desirably provided on the under side of the cover member 6 as is particularly well shown in Figure 2. Sight-glass members 28 also are desirably provided to permit of the inspection of the reaction within the chamber without the necessity of opening the closed container.

Figure 4:
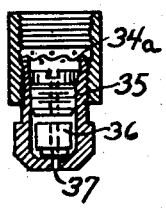
Fig. 4 is a view in vertical section of the spray nozzle for atomizing the catalyst into the reactor vessel.

In the operation of this embodiment of the invention, a suitable quantity of the refrigerant, which may be liquid propane or liquid ethane or preferably liquid ethylene, is delivered through the supply pipe 3 to the reactor 1. The reactor, which is preferably constructed from a nickel alloy steel, is cooled rapidly by volatilization of the refrigerant, simultaneously the cooling is aided by the cooling effect of a further portion of liquid ethylene in the refrigerant jacket 15. The volatilized gas from the refrigerant is discharged through an exit pipeline 11 from the reactor and an exit line 18 from the cooling jacket to equipment for condensation and recycling or other use. When the reactor and other members of the device are cooled to the desired low temperature, the desired quantity of olefin, which may be liquid isobutylene, is delivered through another delivery pipeline 3 to the reactor. At any convenient time up to this point, a power source associated with the driving shaft 23 is put into operation to rotate the propeller 24. When the desired charge of reactant mix has been built up in the reactor and the propeller 24 is revolving rapidly, the catalyst is delivered to the input line 5 the end of which, in the reaction vessel, is provided with a nozzle as shown in Fig. 4, through which the catalyst, either boron fluoride or an active halide dissolved in an alkyl halide, is forced under pressure at right angles to the swirling reaction mixture, thereby resulting in excellent and rapid mixing of the catalyst with the reacting liquid.

The speed of rotation of the stirring propeller 24 preferably ranges between 400 R. P. M. and 1500 R. P. M., depending upon the character of the reactants, the relative size of the reactor and the propeller and the character and rate of delivery of the catalyst. It seems probable that the rapidly churning eddies produced at the circumferential edges of the propeller blades disperse the catalyst into the reaction mixture at an exceedingly rapid rate, probably in time intervals measured in a minute fraction of a second, and that the catalyst is dispersed in droplets so small or bubbles, if boron fluoride is used, that they are completely dissolved through the solution interface into the reactant mix before the polymerization reaction has proceeded to such an extent as to make any substantial change in the concentration of the reactant adjacent to the interface of the bubble or droplet. These presumptions are offered as possible suggestions and as plausible reasons for the phenomena that occur. They have not, however, been proved and they are not offered as settled facts nor is reliance placed upon them for explanation of the physical aspects of the invention.

The delivery of the catalyst is continued until the desired amount of polymerization has been obtained. During the course of operation a small amount of polymer fringe may form on the lower end of the center chimney 7. Although the formation of such fringe does not cause any difficulty in the operation, it is nevertheless desirable to avoid fringes by the use of a film of methyl chloride delivered through the perforated spray pipe member 12 so that it flows in a thin film down the central chimney 7 to keep the chimney lip wetted and free of polymer.

In the course of the polymerization reaction, the rapid rotation of the stirring members 24 sets the contents of the reactor vessel 1 into rapid rotation, developing a considerable amount of centrifugal force sufficient in amount to carry the reactant liquid up to the inverted, annular cover 6 and along the under, concave, surface towards the center of the reactor vessel. It is discharged from the under surface of the cover 6 past the lower edge of the flue member 7 and returned to the center of the reactor 1 where it is again caught by the blades 24 for reswirling and retravelling up the sides of the reactor vessel and over the under surface of the inverted, annular cover. This procedure gives an exceedingly rapid and efficient stirring and mixing of the olefinic materials; stirs the catalyst into the reaction mixture with very high efficiency, and results in a very satisfactory polymerization reaction.

Also, there is no free interface between the liquid and the gaseous cover, such as occurs in a reactor having vertical sides; at which interface, polymerization reaction may occur to deposit the solid polymer on the surface. Instead, the interface occurs at the lower edge of the flue 7 under conditions of rapid, controlled, uniform flow of the polymerization mixture past the flue edge. The high rate of travel of the reaction mixture results in a minimum of spattering, and in fact, the substantial absence of spattering of the reaction liquid out of the path of travel onto the inner surface of the flue 7. Accordingly, practically no reactant liquid is deposited on the inner surface of the flue; and the small amount which is deposited on the flue, is readily washed off by the thin film of ethyl chloride flowing down the inner surface of the flue 7 from the perforated spray pipe member 12. When the desired amount of polymerization has been obtained as determined by inspection of the reactant mix through a sight glass 28 located in any desirable portion of the inverted annular cover, the delivery of the catalyst is stopped and the reaction is desirably quenched by the application to the reaction mixture through the chimney 7 of an oxygenated organic liquid such as an alcohol, or aldehyde, or alkali or water or ammonia or any other suitable catalyst quenching material.

In the single batch type of operation the reactor may then be discharged in any convenient manner such as by draining the product slurry through a bottom outlet while the unpolymerized material in the reaction vessel may be discharged through the draw-off pipe 25. Or the reactor may be emptied by unbolting the inverted annular cover and scooping out the solid polymer, or by other means.

In a continuous type of operation the procedure is the same as above described with the exception that the reactants and catalyst are fed continuously, the reaction is conducted continuously and the rate of polymer discharge is controlled by the butterfly valve 26. This valve is shown in vertical cross-section in Fig. 8, wherein numeral 33 designates a hand wheel, and the valve stem and butterfly valve plate are designated by numerals 34 and 26 respectively. Due to the centrifugal force developed by the rotary stirrer 24, the polymer slurry is forced out through the draw-off pipe 25, the amount of slurry passing through this pipe being regulated by means of the butterfly valve 26.

By this procedure there is thus readily obtained a very high molecular weight polyisobutylene. Since liquid ethylene is used for the refrigerant, giving temperatures of approximately −98° C. (ethylene alone boils at approximately −103° C.) and high purity isobutylene is used with boron trifluoride as the catalyst, this reactor as shown in Fig. 1 is capable of producing polyisobutylene having molecular weights ranging from 100,000 up to 450,000 or above, substantially free from undesirably low molecular weight materials and without any tendency for polymer accumulation at either the reactor walls or impeller arms at, or above, or below the liquid level in the reactor.

This embodiment of the invention is particularly advantageous for the preparation of interpolymers of mixed olefins such as isobutylene with a diolefin to give an elastic material of high molecular weight and low unsaturation which can be cured with sulfur. For this use, the reacting liquid feed entering through feed pipe 3 is fed continuously to the reactor near the impeller shaft 23.

As an alternative for this feed arrangement, the catalyst may be introduced through a hollow reactor shaft 23 and the reacting feed may be delivered through a side wall connection 3. In conducting this polymerization, the refrigerant jacket 15 of Fig. 1 is charged with an appropriate quantity of liquid ethylene to bring the temperature to the desired low value and to provide the desired low temperature through the entire reaction. To the reaction chamber 1 there is added sufficient methyl chloride to serve as a diluent for the reactant material. To the desired quantity of methyl chloride there is then added an appropriate quantity of a mixture of isobutylene and a diolefin such as butadiene, isoprene, pentadiene, or dimethyl butadiene in the proportion of from 70 to 99 parts of the isobutylene with 30 to 1 part of the diolefin. At any convenient stage during the preparation of this mixture, the impeller shaft 23 is put into rotation and with it the blades 24 are likewise rotated. The speed of rotation is desirably about 1000 R. P. M.

Meanwhile the catalyst solution consisting of $AlCl_3$ dissolved in methyl chloride to a concentration of 0.5 gram per 100 cc. is prepared and chilled to about −78° C. and admitted through the feed pipe 5 at a rate of about 100 cc./minute. The catalyst solution is forced under pressure at right angles to the swirling reaction mixture whereby excellent and rapid mixing of the catalyst with the reacting liquid is obtained.

The liquid catalyst is thrown out by the circumferential edge of the propeller blades under conditions of relatively high pressure because of the centrifugal force developed by the speed of rotation and it is thrown in relatively small streams into the eddy zones behind the edges of the blades and the reaction between the stream of catalyst solution and the vigorous eddies results in a very rapid dispersal of the catalyst into exceedingly small droplets which are absorbed in a very short period of time into the body of the solution. The rapid stirring of the main body of the solution, together with the high degree of dispersal of the catalyst solution results in highly advantageous polymerization conditions. In consequence a relatively high molecular weight material is obtained which also is substantially free from undesirable low molecular weight interpolymers with elimination of the shortcomings of the prior used polymerization vessels.

It is to be noted that alternatively the agitating propeller or paddle may also be driven through the top of the reactor body, preferably by a shaft passing through the cover 9 and chimney 7.

The reaction of the mixed iso-olefinic and diolefinic materials in the presence of the dissolved AlCl₃ catalyst occurs at a slower rate than the reaction with the iso-olefin alone. Accordingly, conditions of stirring and temperature which produce a very high molecular weight polymer of isobutylene produce a considerably lower molecular weight interpolymer of isobutylene and butadiene which may range from 65,000 to 200,000. Also, it is usually desirable that the reaction be stopped when from 65% to 95% of the admixed reactants have interpolymerized. For this purpose the reaction is desirably arrested by the addition of an alcohol such as isopropyl alcohol or other oxygenated liquids or water or alkalis, as above indicated. The interpolymer resulting from this polymerization reaction has a relatively low iodine number, preferably ranging between 1 and 9; yet it is reactive with sulfur for a curing reaction which develops in it an elastic limit and a definite tensile strength. The interpolymer as removed from the reactor is desirably washed with water in a Werner and Pfleiderer type of kneader to remove residual traces of catalyst and quenching liquid. It is then compounded with sulfur in approximately the proportion of 3 parts, zinc oxide in the proportion of 5 parts, stearic acid in the proportion of 3 parts, and a vulcanizer in the form of "Tuads" (tetramethylthiuram disulfide) 1 part, per 100 parts of the polymer, and if desired with from 50 to 200 parts carbon black. The resulting compound may be moulded and cured under heat and pressure for a time interval ranging from 15 to 60 minutes at a temperature ranging from 139° C. to 165° C. The resulting cured polymer has a tensile strength ranging from 3000#/sq. in. and an elongation at break ranging from 800 to 1250%.

Figure 3:
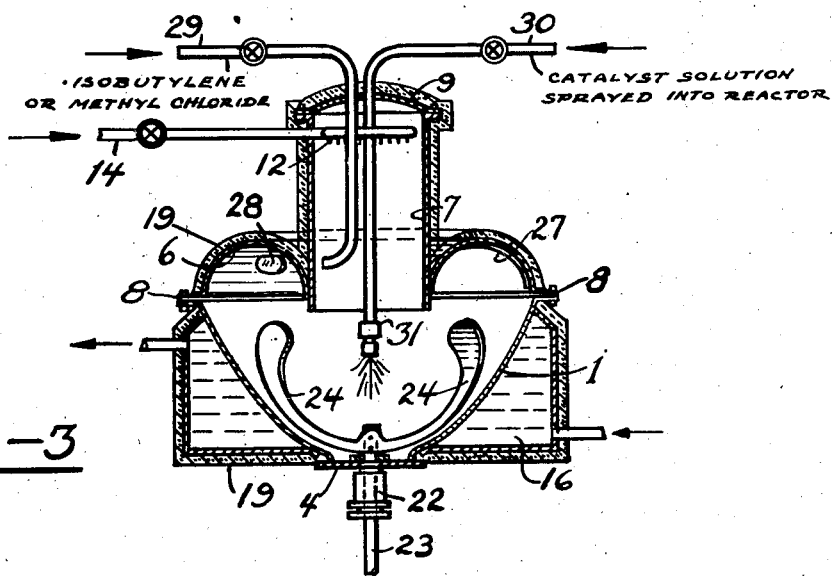
Fig. 3 is a view in vertical section of an alternative embodiment of the polymerization reactor.
Figure 5:
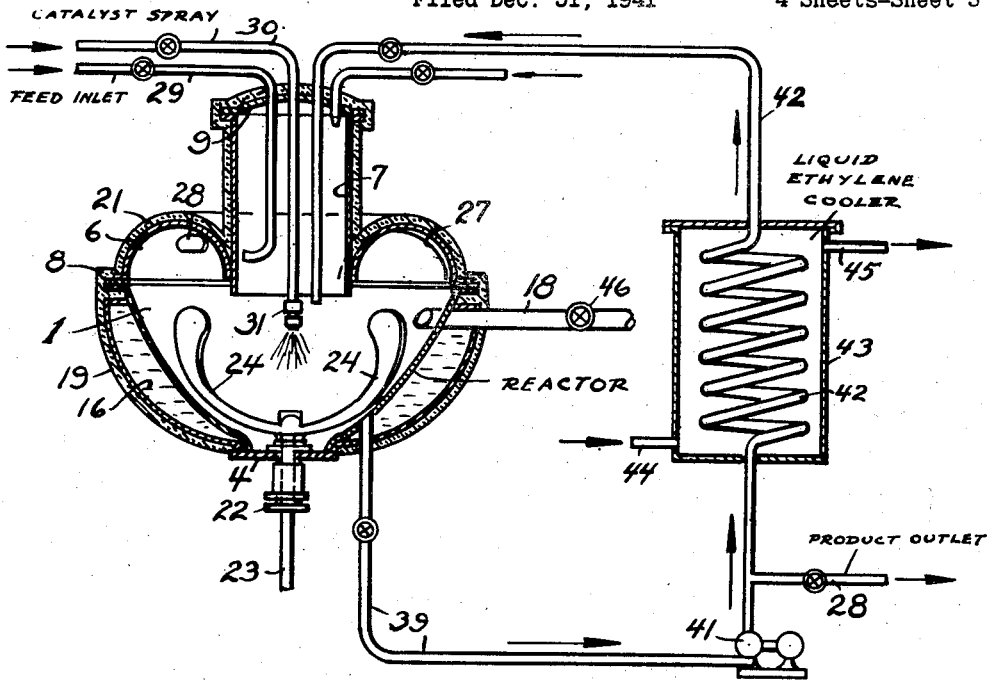
Fig. 5 is a view in vertical section of an alternative embodiment of the polymerization reactor in combination with a cooling coil for series polymerization reactions with an external refrigerant.

Figs. 3 and 5 show alternative embodiments of the present invention. Fig. 3 shows an alternative embodiment in which the reaction mixture and the catalyst solution is sent into the reaction vessel through the chimney 7. Fig. 5 shows an alternative embodiment utilizing a tank to maintain a constant liquid head or in connection with a coil in series respectively.

In Fig. 4 an enlarged view of the spray nozzle for atomizing the catalyst solution with reaction vessel 1 is shown to contain a filter screen 34a of about 40 mesh followed by valve 35 which may be adjusted to obtain a desired rate of flow of the catalyst stream and a lower plug member 36 having spiral grooves through which the catalyst is forced into small spiral streams, which leave a small nozzle orifice 37 in an atomized cone-shaped spray.

Referring to Fig. 3, this alternative embodiment provides for the introduction of the reaction mixture feed and the catalyst solution through a reaction mixture feed line 29 and a catalyst solution feed line 30 by which the catalyst solution is sprayed into the reaction vessel 1.

In the operation of this embodiment of the invention, the reactor is filled with the desired mixture of reactants which are fed into the reaction vessel 1 by means of the feed line pipe 29. In this mixture, the reactants may be the simple iso-olefins such as isobutylene or may consist of the mixed olefins such as isobutylene and a di-olefin as above described. When the refrigerant jacket of the reactor has been cooled to the desired low temperature by means of liquefied ethylene and the mixture in the desired proportions as above indicated fully prepared and led into the reactor, the stage of the addition of the catalyst is reached. At that time the propeller shaft 23 and paddle 24 are put into operation and the flow of the catalyst through the feed line pipe 30 and through the spray nozzle 31 may then be started. The catalyst may consist of gaseous boron trifluoride in which case the feed line 30 is used without the spray nozzle by simply immersing it to the bottom of the reactor. This feed line passes through the chimney 7 and into the swirling reaction mixture where it is rapidly dispersed therein. Alternatively a liquid catalyst may be used such as the above described solution of AlCl₃ in a low freezing solvent in which case the spray nozzle 31 is utilized.

Alternatively, the device shown in Fig. 5 is employed as a continuous unit for the polymerization of olefinic materials when the reactor is utilized in connection with a coil-in-series-method. In the operation of this embodiment, the reactor 1 is filled through pipe 29 with the desired mixture of reactants as above described. When the reactor has been filled to a predetermined liquid level with a reaction mixture, the reaction mixture is cooled to the desired low temperature by being circulated through cooler pipe line 39. The feed mixture is forced by a pump 41 to cooling coils 42 enclosed by a refrigerating jacket 43 through which the refrigerant (ethylene) is passed through inlet 44 and exits through pipe 45. The propeller blade mixer 24 is previously put into rotation and the flow of catalyst then started. The liquid catalyst, which consists of a solution of AlCl₃ in a low freezing solvent as above described is discharged via line 30 through spray nozzle 31 and the catalyst flow is maintained until the polymer concentration in the slurry reaches a desired value. The draw-off valve 46 is opened to such an extent that the volume of slurry and reactants withdrawn is equal to the volume of the feed entering feed line 29. This continuous process is controlled by the concentration of catalyst, the rate of circulation and the concentration of the polymerizable reactants. In this embodiment it is desirable to employ the externally cooled coil 42 since the temperature is readily controlled by this means independently of the amount of diluent present in the reaction mixture and the transfer of heat is sufficient to produce a free-flowing mixture of slurry and unreacted components. The recovery of the polymer may be accomplished as above described.

Figure 6:
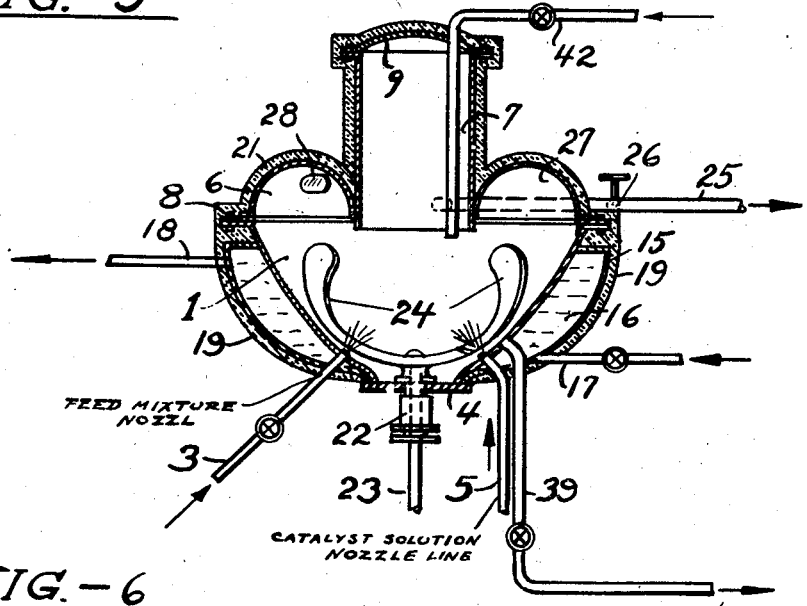
Fig. 6 is a view in vertical section of an alternative embodiment of the polymerization reactor when used in connection with the coil in a series polymerization reaction where no internal refrigerant is used.

In Fig. 6 there is shown another alternative embodiment which may be used in connection with the coil in series method. The reactor vessel is essentially the same as shown in Fig. 5 with the exception that the feed mixture and catalyst solution is supplied through the bottom of the reactor by means of pipes 3 and 5 respectively.

In Fig. 7 there is shown an arrangement of the reactor vessel coupled to an intermediate tank 53 in order to maintain a constant liquid level and to dispense with the need of valves and butterfly deflectors in its inlet or outlet system.

In Fig. 8 there is shown a vertical section of the butterfly valve plate arrangement used in continuous operations wherein hand wheel 33 attached to valve stem 34 controls the opening and closing of draw-off pipe 25 by means of the butterfly valve plate 26.

In the operation there are three alternative methods by which the device shown in Fig. 7 can be operated. The first is to utilize the reactor 1 without an ethylene jacket. The agitator propeller blade in reactor 1 may be omitted and the propeller blades 24 driven by a shaft 23 attached to a motor, and previously put into operation. The reaction mixture of liquid ethylene and isobutylene or liquid ethylene with an isobutylene-diolefin mixture in the ratio of 1 to 4 respectively is fed through a pipe line 3. The catalyst, either gaseous boron trifluoride, or AlCl₃ in solution in methyl or ethyl chloride, is simultaneously introduced through pipe 5 and discharged through spray nozzle 31. The rate of introduction of the feed and catalyst is so controlled that the liquid level in the reactor 1 and intermediate tank 53 is at a predetermined height. The polymerization reaction is almost instantaneous and the polymer slurry formed is drawn off through the overflow pipe 54 and processed as above described.

The second alternative is to surround the reactor 1 with a refrigerant jacket (not shown) similar to that as shown in Fig. 1. The operation is similar to that above described with the exception that in this case the reaction mixture does not contain any ethylene and is externally cooled by the ethylene in the refrigerant jacket.

The third alternative is to connect a cooling coil in series to the reactor 1 as shown in Fig. 5, between the reactor vessel and the intermediate tank.

Thus the invention provides a new process by which olefins or olefin-diolefin mixtures are polymerized at low temperatures in a reaction vessel arranged in the shape of a concave hemispherical vessel so that the whirling polymerizable liquid mixture will travel up the entire reactor wall to the cover where the cover contours return the liquid mixture to the bulk of the liquid in the reactor bottom without forming adhering clumps of polymer bodies on the wall and impeller arms above the liquid level of the mixture.

The polymerization vessel and the various embodiments thereof, which are herein disclosed, are intended primarily for the polymerization of olefins and olefin-diolefin mixtures. The advantages of this reaction vessel in the above disclosed embodiments thereof are not, however, limited to such olefinic reaction mixtures at low temperature. The same reaction vessel (made of stainless steel or other non-corrosive metals) may be used for the acid adsorption of refinery olefins; the acid is dispersed in the reactor to react with the olefins passing in a stream through the reactor in substantially the same way in which the catalyst, either gas or liquid, moves in the foregoing description. The same procedure and the same apparatus may be used for treating naphthas, oils, etc., with reagents such as alkali solutions, doctor solutions, solvent extraction liquids and the like. The apparatus and procedure are similarly useful for alkylation reactions, the acid and paraffins being agitated with, and converted into, the hydrocarbons by means of the large vortex created by the propeller blades moving in one direction, at a sufficient speed to carry the liquid over the walls and cover of the reactor vessel.

In the foregoing examples and throughout this specification and the appended claims, wherever the term "olefinic material" is used, it refers to iso-olefins such as isobutylene or to polyolefins such as butadiene, isoprene, pentadiene-1,3; 2-methyl butadiene-1,5; myrcene, hexatriene or any other mono-olefins, polyolefins or homologues thereof capable of interpolymerization with an iso-olefin.

While there are above disclosed but a limited number of embodiments of the device of the invention, it is possible to provide still other embodiments without departing from the inventor's concept herein disclosed and it is therefore desired that only such limitations be imposed upon the appended claims as are stated therein or required by the prior art.

I claim:

1. A polymerization process for the polymerization of liquid, olefinic material to solid polymers at temperatures within the range between 0° C. and −110° C. comprising the steps in combination of liquefying and cooling an isobutylene-containing material to a temperature within the range between 0° C. and −110° C., stirring the isobutylenic material through a helical cardioid path, returning the stirred liquid to the center of the cardioid path for recirculation, venting volatilized gases from the stirred isobutylene-containing material through a central path from the returned liquid, past a free-falling, non-splashing stream of isobutylene-containing material, feeding to the circulating stream of isobutylene-containing material, while traveling in the helical cardioid path, a supply of Friedel-Crafts polymerization catalyst in fluid form to polymerize at least a portion of the isobutylene-containing material to a solid polymer, and preventing obstruction of the circulating path during the polymerization reaction by the free-falling, non-splashing character of the helical cardioid stream through its return for recirculation.

2. A polymerization process for the polymerization of liquid, olefinic material to solid polymers at temperatures within the range between 0° C. and −110° C. comprising the steps in combination of liquefying and cooling an isobutylene-containing material by the admixture therewith of a carbonaceous refrigerant material to a temperature within the range between 0° C. and −110° C., stirring the isobutylenic material through a helical cardioid path, returning the stirred liquid to the center of the cardioid path for recirculation, venting volatilized gases from the stirred isobutylene-containing material through a central path from the returned liquid, past a free-falling, non-splashing stream of isobutylene-containing material, feeding to the circulating stream of isobutylene-containing material while traveling in the helical cardioid path, a supply of Friedel-Crafts polymerization catalyst in fluid form to polymerize at least a portion of the isobutylene-containing material to a solid polymer, and preventing obstruction of the circulating path during the polymerization reaction by the free-falling, non-splashing character of the helical cardioid stream through its return for recirculation.

3. A polymerization process for the polymerization of liquid, olefinic material to solid polymers at temperatures within the range between 0° C. and −110° C. comprising the steps in combination of liquefying and cooling an isobutylene-containing material by the application thereto of a separate refrigerating material to a temperature within the range between 0° C. and −110° C., stirring the isobutylenic material through a helical cardioid path, returning the stirred liquid to the center of the cardioid path for recirculation, venting volatilized gases from the stirred isobutylene-containing material through a central path from the returned liquid, past a free-falling, non-splashing stream of isobutylene-containing material, feeding to the circulating stream of isobutylene-containing material, while traveling in the helical cardioid path, a supply of Friedel-Crafts polymerization catalyst in fluid form to polymerize at least a portion of the isobutylene-containing material to a solid polymer, and preventing obstruction of the circulating path during the polymerization reaction by the free-falling, non-splashing character of the helical cardioid stream through its return for recirculation.

4. A polymerization process for the polymerization of liquid, olefinic material to solid polymers at temperatures within the range between 0° C. and −110° C. comprising the steps in combination of liquefying and cooling an isobutylene-containing material to a temperature within the range between 0° C. and −110° C., stirring the isobutylenic material through a helical cardioid path, returning the stirred liquid to the center of the cardioid path for recirculation, venting volatilized gases from the stirred isobutylene-containing material through a central path from the returned liquid, past a free-falling, non-splashing stream of isobutylene-containing material, feeding to the circulating stream of isobutylene-containing material, while traveling in the helical cardioid path, a supply of Friedel-Crafts polymerization catalyst in fluid form to polymerize at least a portion of the isobutylene-containing material to a solid polymer, and preventing obstruction of the circulating path during the polymerization reaction by the free-falling, non-splashing character of the helical cardioid stream through its return for recirculation, and simultaneously delivering to the helical cardioid circulating stream a continuing supply of polymerizable material and removing from the helical cardioid circulating stream a portion of liquid containing suspended solid polymer.

5. A polymerization process for the polymerization of liquid, olefinic material to solid polymers at temperatures within the range between 0° C. and −110° C. comprising the steps in combination of liquefying and cooling an isobutylene-containing material by the admixture therewith of a carbonaceous refrigerant material to a temperature within the range between 0° C. and −110° C., stirring the isobutylenic material through a helical cardioid path, returning the stirred liquid to the center of the cardioid path for recirculation, venting volatilized gases from the stirred isobutylene - containing material through a central path from the returned liquid, past a free-falling, non-splashing stream of isobutylene-containing material, feeding to the circulating stream of isobutylene-containing material while traveling in the helical cardioid path, a supply of Friedel-Crafts polymerization catalyst in fluid form to polymerize at least a portion of the isobutylene-containing material to a solid polymer, and preventing obstruction of the circulating path during the polymerization reaction by the free-falling, non-splashing character of the helical cardioid stream through its return for recirculation, and simultaneously delivering to the helical cardioid circulating stream a continuing supply of polymerizable material and carbonaceous refrigerant, and removing from the helical cardioid circulating stream a portion of liquid containing suspended solid polymer.

ROBERT A. GERLICHER.

REFERENCES CITED

The following references are of record in the file of this patent:

UNITED STATES PATENTS

| Number | Name | Date |
| --- | --- | --- |
| 2,074,673 | Sackett | Mar. 23, 1937 |
| 611,432 | Katzenstein | Sept. 27, 1898 |
| 700,472 | Biznchini | May 20, 1902 |
| 2,085,524 | De Simo | June 29, 1937 |
| 2,097,468 | Rabe | Nov. 2, 1937 |
| 2,269,421 | Arveson | Jan. 13, 1942 |
| 1,922,784 | Sheriff et al. | Aug. 15, 1933 |
| 2,000,418 | Ruth, Jr. | May 7, 1935 |